(12) United States Patent
Jain et al.

(10) Patent No.: US 11,621,645 B2
(45) Date of Patent: Apr. 4, 2023

(54) METHODS AND DEVICE TO DRIVE A TRANSISTOR FOR SYNCHRONOUS RECTIFICATION

(71) Applicants: STMICROELECTRONICS INTERNATIONAL N.V., Plan-les-Ouates GE (CH); STMicroelectronics S.r.l., Agrate Brianza (IT)

(72) Inventors: Akshat Jain, Nahan (IN); Ivan Clemente Massimiani, Catania (IT)

(73) Assignees: STMicroelectronics International N.V., Geneva (CH); STMicroelectronics S.r.l., Agrate Brianza (IT)

( * ) Notice: Subject to any disclaimer, the term of this patent is extended or adjusted under 35 U.S.C. 154(b) by 84 days.

(21) Appl. No.: 16/892,385

(22) Filed: Jun. 4, 2020

(65) Prior Publication Data
US 2021/0384813 A1  Dec. 9, 2021

(51) Int. Cl.
*H02M 3/335* (2006.01)
*H02M 1/00* (2006.01)
*H02M 1/08* (2006.01)
*H02M 7/219* (2006.01)

(52) U.S. Cl.
CPC ..... *H02M 3/33592* (2013.01); *H02M 1/0025* (2021.05); *H02M 1/08* (2013.01); *H02M 3/33515* (2013.01); *H02M 7/219* (2013.01)

(58) Field of Classification Search
CPC .... H02M 3/01; H02M 3/335; H02M 3/33515; H02M 3/33569; H02M 3/33571; H02M 3/33576; H02M 3/33592; H02M 1/08; H02M 1/0025
See application file for complete search history.

(56) References Cited

U.S. PATENT DOCUMENTS

| 6,055,170 A * | 4/2000 | Yee .................. H02M 3/33592 363/89 |
| 6,140,777 A * | 10/2000 | Wang .................. H02M 1/4225 315/247 |
| 7,599,198 B2 | 10/2009 | Tao et al. |
| 8,488,355 B2 | 7/2013 | Berghegger |

(Continued)

OTHER PUBLICATIONS

Steval, "45 W USB Type-CTM Power Delivery Adapter Reference Design Based on STCH03, STM32F051 and STUSB1602A," STEVAL-USBPD45C, Data Brief, Feb. 3, 2019, 9 pages.

(Continued)

*Primary Examiner* — Gustavo A Rosario-Benitez
(74) *Attorney, Agent, or Firm* — Slater Matsil, LLP

(57) ABSTRACT

A driving circuit including a reference voltage generator to generate a reference voltage based on an operating frequency of a complementary circuit; a comparator including a first input configured to receive a drain-to-source voltage of a field effect transistor; and a second input to receive the reference voltage; and a signal generator to deliver a driving signal to a gate terminal of the field effect transistor to drive the field effect transistor to an ON state after the drain-to-source voltage of the first low side field effect transistor becomes less than the reference voltage and to an OFF state after the drain-to-source voltage of the field effect transistor becomes greater than the reference voltage.

24 Claims, 11 Drawing Sheets

(56) References Cited

U.S. PATENT DOCUMENTS

| | | | |
|---|---|---|---|
| 8,824,168 B2 | 9/2014 | Hua et al. | |
| 10,658,917 B2 | 5/2020 | Massimiani | |
| 10,804,810 B2* | 10/2020 | Zhang | H02M 3/33592 |
| 2010/0013636 A1* | 1/2010 | Wu | G01S 13/38 |
| | | | 342/28 |
| 2010/0118565 A1 | 5/2010 | Stuler | |
| 2010/0315137 A1* | 12/2010 | Kimura | H03L 1/026 |
| | | | 327/156 |
| 2011/0096578 A1 | 4/2011 | Fang et al. | |
| 2011/0204935 A1* | 8/2011 | Kimura | G06F 1/0328 |
| | | | 327/156 |
| 2012/0020123 A1 | 1/2012 | Hsu | |
| 2012/0223691 A1* | 9/2012 | Weinstein | H02M 3/156 |
| | | | 323/283 |
| 2012/0242300 A1* | 9/2012 | Ueno | H02M 3/156 |
| | | | 323/234 |
| 2013/0063985 A1 | 3/2013 | Ye et al. | |
| 2014/0192575 A1 | 7/2014 | Olivik et al. | |
| 2015/0023062 A1* | 1/2015 | Hyugaji | H02M 3/33592 |
| | | | 363/16 |
| 2015/0049521 A1 | 2/2015 | Iorio et al. | |
| 2015/0103563 A1* | 4/2015 | Wang | H02M 3/33592 |
| | | | 363/17 |
| 2015/0280455 A1* | 10/2015 | Bosshard | B60L 53/122 |
| | | | 307/104 |
| 2015/0303790 A1* | 10/2015 | Lin | H02M 1/4225 |
| | | | 363/89 |
| 2016/0218634 A1* | 7/2016 | Du | H02M 3/33592 |
| 2016/0294298 A1 | 10/2016 | Wong et al. | |
| 2019/0229634 A1 | 7/2019 | Moon et al. | |
| 2019/0333744 A1* | 10/2019 | Nagami | H01J 37/32935 |
| 2020/0252004 A1* | 8/2020 | Wee | H05B 45/14 |
| 2020/0287487 A1* | 9/2020 | Kimura | H02P 8/12 |
| 2020/0412254 A1* | 12/2020 | Kong | H02M 3/33515 |
| 2021/0100082 A1* | 4/2021 | Aoki | H05B 45/38 |
| 2021/0226548 A1* | 7/2021 | Chen | H02M 3/33592 |
| 2021/0333233 A1* | 10/2021 | Shirai | A61B 5/7203 |

OTHER PUBLICATIONS

Yu, Oscar et al., "Drain-Source Synchronous Rectifier Oscillation Mitigation in Light-Load Conditions", IEEE Open Journal of Power Electronics Regular Paper, vol. 1, pp. 14-23, 2020.

* cited by examiner

METHODS AND DEVICE TO DRIVE A TRANSISTOR FOR SYNCHRONOUS RECTIFICATION

TECHNICAL FIELD

The description relates to driving a transistor and corresponding devices and methods.

BACKGROUND

In various power conversion systems, such as AC/DC and DC/DC converters, field effect transistors or FETs (MOSFET transistors, for instance) driven by control logic may be used to replace rectifier diodes.

This technique, oftentimes referred to as synchronous rectification (SR), is found to improve converter efficiency. Resorting to SR facilitates reducing conduction losses insofar as the (rectified) output current flows through the MOSFET channel instead of the rectification diode, with power losses correspondingly reduced.

Such a power converter continues to operate also if a synchronous rectification FET is not driven. This is because rectification is still provided by an internal body diode of the MOSFETs.

Variations in the operating conditions of a complementary circuit may impact the timing and performance of a synchronous rectification circuit. Inefficiencies or MOSFET failure may also result when there are changes in the operating conditions of complementary circuits. Changes in the load or the operating frequency of a complementary component may change the response in the rectification circuit, which can cause a transistor to be inefficiently driven for rectification.

SUMMARY

In accordance with an embodiment of the present invention, a driving circuit includes a reference voltage generator to generate a reference voltage wherein the reference voltage is based on an operating frequency of a complementary circuit. The driving circuit further includes a comparator including: a first input configured to receive a drain-to-source voltage of a first low side field effect transistor; and a second input coupled to an output of the reference voltage generator to receive the reference voltage. The driving circuit further includes a signal generator coupled to an output of the comparator, the signal generator being configured to deliver a driving signal to a gate terminal of the first low side field effect transistor to drive the first low side field effect transistor to an ON state after the drain-to-source voltage of the first low side field effect transistor becomes less than the reference voltage and to drive the first low side field effect transistor to an OFF state after the drain-to-source voltage of the first low side field effect transistor becomes greater than the reference voltage.

In accordance with an embodiment of the present invention, a rectification circuit includes: a first field effect transistor; a second field effect transistor; a third field effect transistor; and a fourth field effect transistor. The rectification circuit further includes a first driving circuit. The first driving circuit is configured to drive the first field effect transistor and the second field effect transistor to an ON state after a drain-to-source voltage of the second field effect transistor becomes less than a first reference voltage and to drive the first field effect transistor and the second field effect transistor to an OFF state after the drain-to-source voltage of the second field effect transistor becomes greater than the first reference voltage. The rectification circuit further includes a second driving circuit. The second driving circuit is configured to drive the third field effect transistor and the fourth field effect transistor to an ON state after a drain-to-source voltage of the fourth field effect transistor becomes less than a second reference voltage and to drive the third field effect transistor and the fourth field effect transistor to an OFF state after the drain-to-source voltage of the fourth field effect transistor becomes greater than the second reference voltage. The rectification circuit further includes an output port configured to be coupled to a load. In accordance with the embodiment of the present invention, the first reference voltage is determined by an operating frequency of a complementary circuit and the second reference voltage is determined by the operating frequency of the complementary circuit and the first field effect transistor, the second field effect transistor, the third field effect transistor, and the fourth field effect transistor are configured to cooperate to provide a rectified current to the output port.

In accordance with an embodiment of the present invention, a method to drive a field effect transistor includes monitoring an operating frequency of a complementary circuit; setting a reference voltage to a first value determined by the operating frequency of the complementary circuit; sensing a drain-to-source voltage of the field effect transistor becoming less than a reference voltage; driving the field effect transistor on; sensing a drain-to-source voltage of the field effect transistor becoming greater than the reference voltage; and driving the field effect transistor off.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

In various power conversion systems, such as AC/DC and DC/DC converters, transistors driven by control logic can replace rectifier diodes from other rectification approaches. The transistors may comprise field effect transistors, like for instance MOSFET transistors. This technique, oftentimes referred to as synchronous rectification, may improve the efficiency of power conversion system.

Figure 1A:
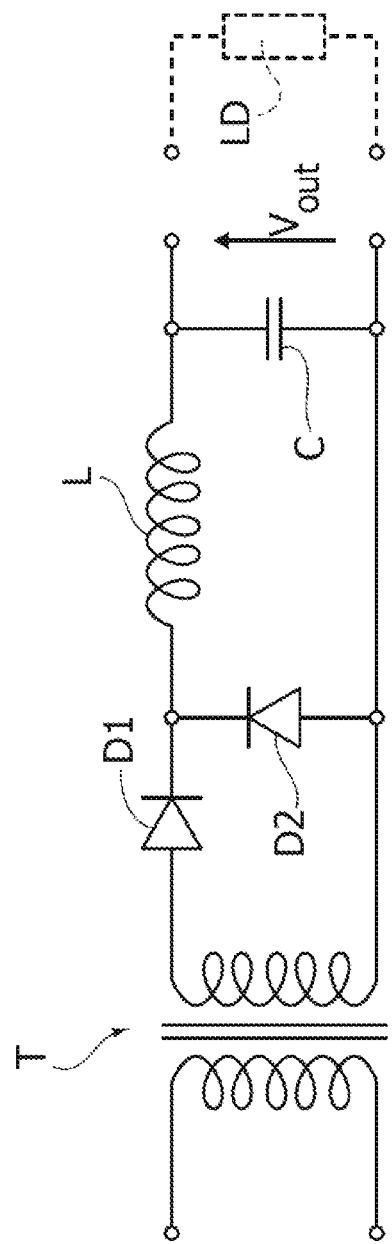
FIG. 1 comprises two portions, FIGS. 1A and 1B, and is representative of the possible replacement of diode rectification with synchronous rectification using field effect transistors (FETs) such as MOSFETs.
Figure 1B:
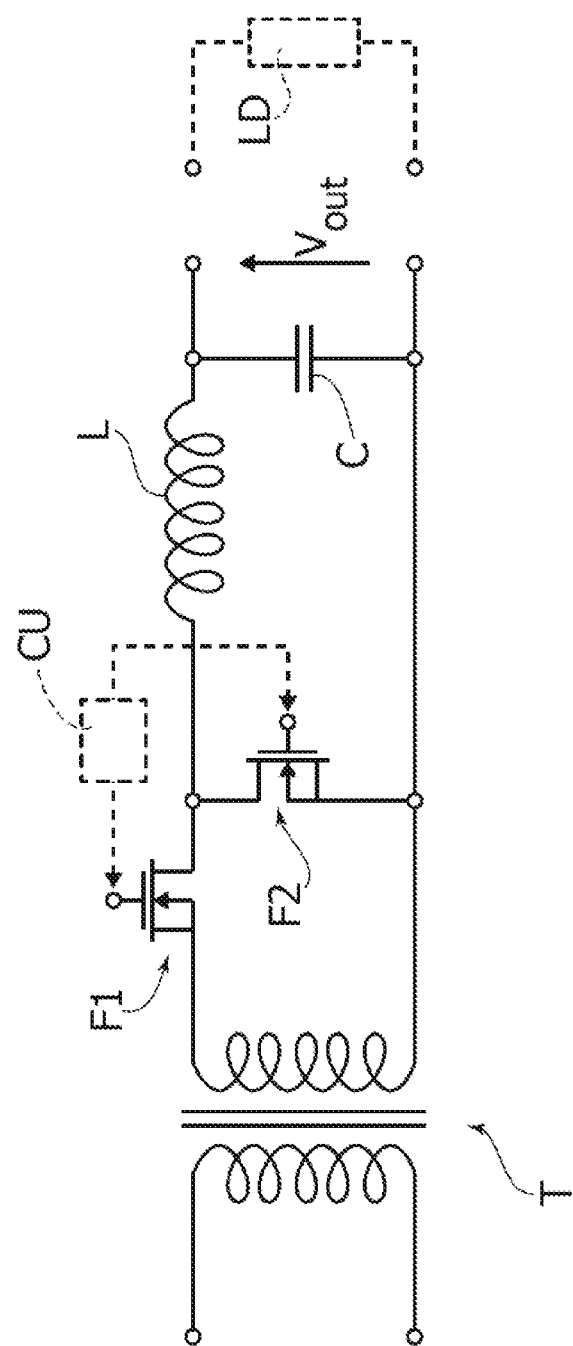

FIGS. 1A and 1B provide an illustration of the possibility of replacing one or more rectification diodes (for instance two rectification diodes D1, D2 in FIG. 1A) with respective corresponding field effect transistors (MOSFET transistors, for instance) F1 and F2 in FIG. 1B within the framework of a rectifier circuit. Field effect transistors may also substituted for diodes in a full bridge rectifier circuit or other rectifier architectures.

Transistors may be located at the secondary side of a transformer T, with the MOSFET transistors F1 and F2 alternatively turned on (that is, made conductive) and off (that is, made non-conductive) under the control of a control unit so that a (rectified) current may flow in channels of the MOSFET transistors F1 and F2.

The rectifier circuit architecture in FIG. 1 includes two diodes D1, D2 (FIG. 1A) or two MOSFET transistors F1, F2 (FIG. 1B) coupled to the secondary winding of a transformer T and having cascaded thereto a LC low pass filter suited to provide a (rectified) voltage signal $V_{out}$ to a load LD.

It will be appreciated that the rectifier circuit architecture in FIG. 1 is just exemplary of a wide variety of rectifier circuits to which synchronous rectification can be applied. Therefore, the circuit architecture of FIG. 1 is not to be construed, even indirectly, as confining the scope of the embodiments.

In various cases a synchronous rectification circuit may comprise or be accompanied by (digital) controller circuits suited to be coupled to field effect transistors (for instance, F1 and F2 in FIG. 1B).

A field effect transistor such as, for instance, a MOSFET may comprises a channel between source and drain terminals as well as a body diode and a gate terminal configured to control electrical current flow in the field effect transistor channel.

As noted, by resorting to synchronous rectification, conduction losses can be reduced thanks to the output current $I_{out}$ flowing through a (MOS)FET channel instead of a rectification diode, so that the power loss is decreased from $P_{loss\_diode} = V_d \cdot I_{out}$ (where $V_d$ is the voltage drop across the diode) to $P_{loss\_MOSFET} = R_{ds\_on} \cdot I_{out}^2$ (where $R_{ds\_on}$ is the drain-source resistance in the "on" or conductive state) which may be (very) low for synchronous rectification MOSFETs.

Figure 2:
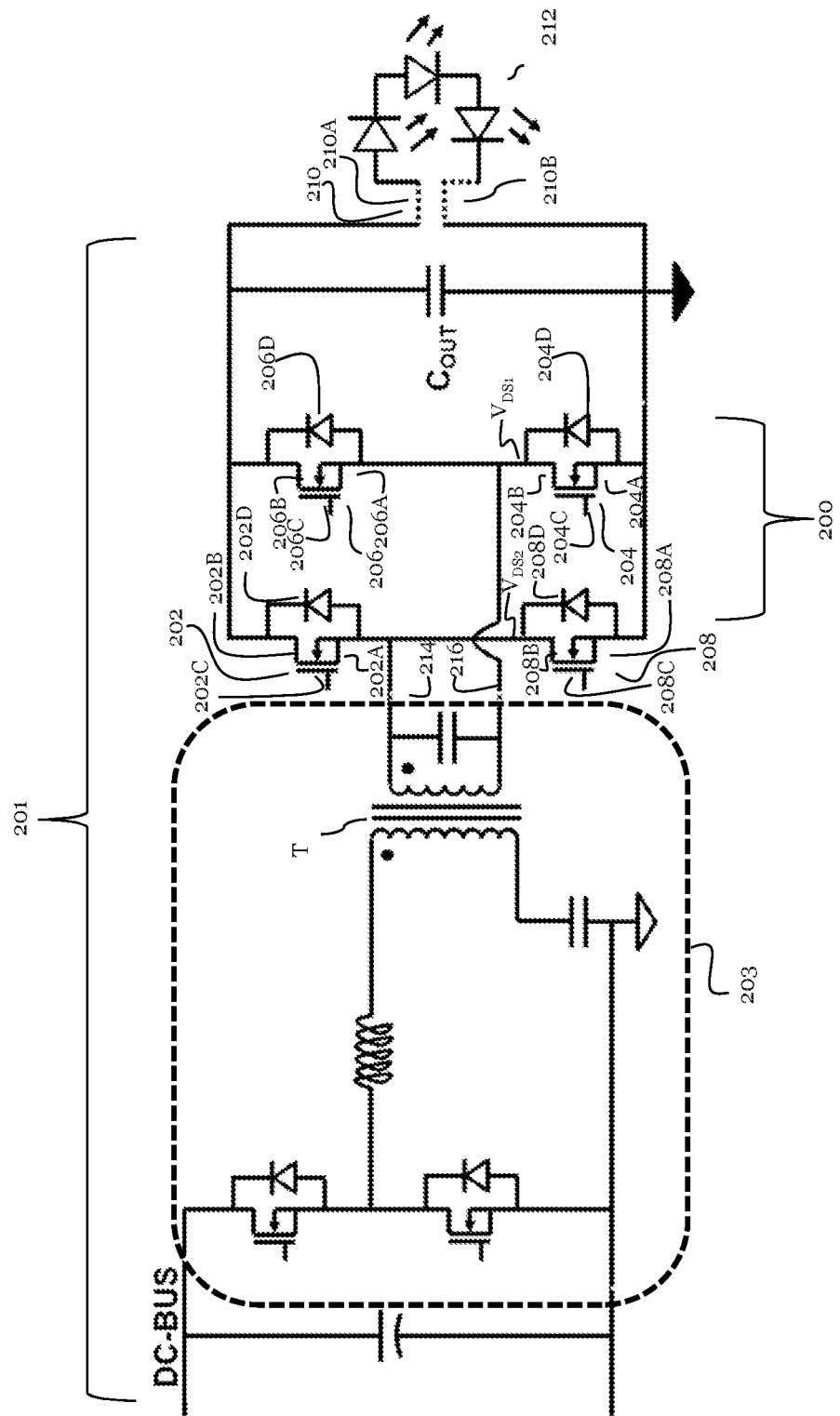
FIG. 2 depicts an LCC resonant converter with a synchronous rectification circuit.

In some embodiments, synchronous rectification may be utilized in full-bridge rectifier architectures. FIG. 2 depicts an LCC resonant converter with synchronous rectification 201. The LCC resonant converter with synchronous rectification 201 comprises a full-bridge synchronous rectification circuit 200. However, a full-bridge synchronous rectification circuit 200 may also be utilized in other architectures including other types of power converters such as LLC resonant converters. As the full-bridge synchronous rectification circuit 200 may be used in other topologies, FIG. 2 should not be construed to confine the scope of the embodiments.

The full-bridge synchronous rectification circuit 200, in various embodiments, may be coupled to the secondary winding of a transformer T. Transformer T may be part of a complementary circuit. In various embodiments, the complementary circuit may comprise a DC-DC stage of the LCC resonant converter with synchronous rectification 201. In various embodiments, the complementary circuit may comprise a Half Bridge LCC 203. As already mentioned, the full-bridge synchronous rectification circuit 200 may also be incorporated into architectures other than the one depicted in FIG. 2.

In various embodiments, a full-bridge synchronous rectification circuit 200 may comprise a first field effect transistor 202 (high side), a second field effect transistor 204 (low side), a third field effect transistor 206 (high side), and a fourth field effect transistor 208 (low side). The full-bridge synchronous rectification circuit 200 may also comprise an output port 210. The output port 210 may be coupled with a load 212.

In various embodiments, a source 202A of the first field effect transistor 202 may be coupled to a first input terminal 214. A drain 202B of the first field effect transistor 202 may be coupled to a first output terminal 210A of the output port 210. A source 204A of the second field effect transistor 204 may be coupled to a second output terminal 210B of the output port 210, and a drain 204B of the second field effect transistor 204 may be coupled to a second input terminal 216.

A source 206A of the third field effect transistor 206 may be coupled to the second input terminal 216; a drain 206B of the third field effect transistor 206 may be coupled to the first output terminal 210A of the output port 210. A source 208A of the fourth field effect transistor 208 may be coupled to the second output terminal 210B of the output port 210, and a drain 208B of the fourth field effect transistor 208 may be coupled to the first input terminal 214.

A first driving signal may be delivered to a gate of the first field effect transistor 202C. The first driving signal may also be delivered to a gate of the second field effect transistor 204C. A second driving signal may be delivered to a gate of the third field effect transistor 206C. The second driving signal may also be delivered to a gate of the fourth field effect transistor 208C.

The first driving signal may turn the first field effect transistor 202 and the second field effect transistor 204 on and off. The second driving signal may turn the third field effect transistor 206 and the fourth field effect transistor 208 on and off. In various embodiments, a high driving signal may turn the first field effect transistor 202 and the second field effect transistor 204 on and a low driving signal may turn the first field effect transistor 202 and the second field effect transistor 204 off. This may be achieved in various ways including, but not limited to, logical implementations or by varying the type of field effect transistor utilized in different embodiments.

Similarly, in various embodiments, a high driving signal may turn the third field effect transistor 206 and the fourth field effect transistor 208 on and a low driving signal may turn the third field effect transistor 206 and the fourth field effect transistor 208 off. This may also be achieved in various ways including, but not limited to, logical implementations or by varying the type of field effect transistor utilized in different embodiments.

A rectified voltage output at the output port 210 may be produced by timing the on periods and the off period of the first field effect transistor 202, the second field effect transistor 204, the third field effect transistor 206 and the fourth field effect transistor 208. The first field effect transistor 202 and the second field effect transistor 204 may be turned on for a first duration. And, the third field effect transistor 206 and the fourth field effect transistor 208 may be turned on during a second duration that does not overlap with the first duration.

It may be desirable to time the driving signals of a synchronous rectification circuit so the power efficiency of the synchronous rectification circuit, and a device incorporating the synchronous rectification circuit, is improved. For example, if an "on" signal is switched off too early, the efficiency of the synchronous rectification circuit may be compromised. If an "on" signal is turned off too late the transistor may be forced to conduct, which may damage the transistor.

In various embodiments wherein a synchronous rectification circuit is implemented in a resonant converter, the operation of the converter may be compromised if the driving signals are wrongly generated.

In various embodiments, synchronous rectification driving schemes may be based on turning field effect transistors on and off as a result of changes in the drain-source voltage of a field effect transistor. Synchronous rectification driving can be realized with analog components, a dedicated integrated circuit, or with a digital approach. A digital implementation of synchronous rectification, such as a microcontroller-managed driving scheme, may allow reduction in the number of components and introduce more flexibility in control algorithm design.

Figure 3:
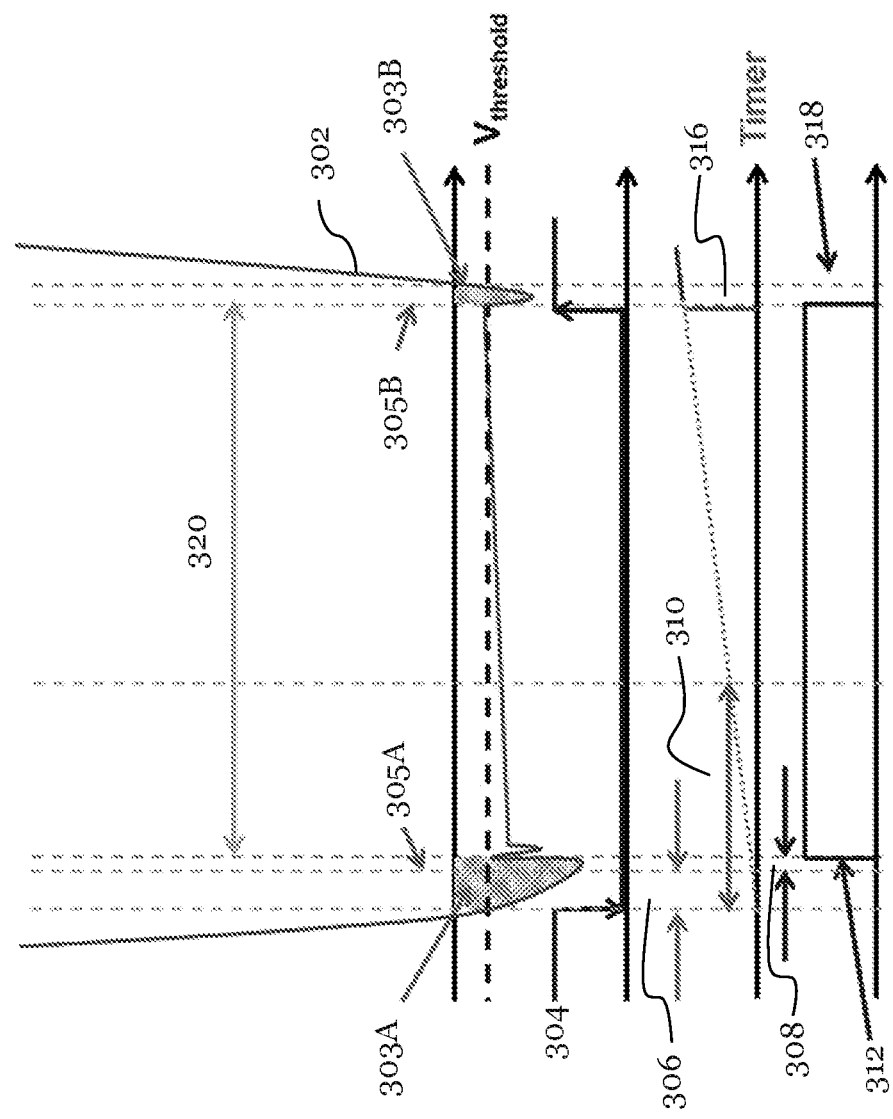
FIG. 3 depicts a graph of the synchronous rectification drain-to-source voltage of a field effect transistor and a driving signal for a field effect transistor.

FIG. 3 depicts a graph of the synchronous rectification drain-to-source voltage of a field effect transistor and a driving signal for a field effect transistor.

A drain-to-source voltage ($V_{DS}$) 302 is sensed by sensing the two node voltages (drain of low side MOSFETs) i.e. 214 and 216. $V_{DS}$ may be compared to a reference voltage threshold ($V_{threshold}$). In various embodiments, this comparison may be performed by a comparator.

When $V_{DS}$ falls below a reference voltage threshold ($V_{threshold}$), the comparator output 304 may trigger a drive signal to turn on a field effect transistor. In various embodiments, the drive signal may be triggered by the falling edge of the comparator output 304. It should also be appreciated that, in various embodiments, the drive signal may be triggered by a rising edge of the comparator output. The comparator output 304 may trigger a timer peripheral of a microcontroller that initiates a pulse to a corresponding synchronous rectification gate driver or drivers. In various embodiments, there may be a turn-on delay 306 and a gate-driver delay 308. The turn on delay 306 may be incorporated into the timer. And, the gate-driver delay 308 may represent time taken to deliver a drive signal after it is initiated by a timer at 305A. After both the turn-on delay 306 and the gate-driver delay 308, the field effect transistor may be on 312.

After the driving signal turns the field effect transistor on, the driving signal may be kept on for a minimum time period where subsequent changes in drain-to-source voltage of the field effect transistor will not trigger a change in the driving signal. This time period may be referred to as a blanking time 310. The blanking time 310 may prevent a false off trigger caused by ringing in the $V_{DS}$ signal for a period of time.

In various embodiments, when $V_{DS}$ increases above $V_{threshold}$ after the blanking period has elapsed, the comparator output may trigger a reset of the timer peripheral of the microcontroller at 305B causing the driving signal to switch the field effect transistor to an off state. This may occur after a turn off delay. A turn-off delay is not shown in FIG. 3. In various embodiments, the rising edge of the comparator signal may trigger the change to an off state. In various embodiments, the falling edge of the comparator signal may trigger the change to an off state. A field effect transistor may also be switched off after a pre-determined maximum time whether or not $V_{DS}$ rises above the threshold voltage.

A body diode of a field effect transistor may conduct when $V_{DS}$ is negative and before the field effect transistor is driven on. This may coincide with the time period between the time when $V_{DS}$ becomes negative and the rising edge of the driving signal 312, and is denoted by 303A in FIG. 3. A body diode of the field effect transistor may also conduct after the field effect transistor is switched off and before $V_{DS}$ becomes positive. This may coincide with the time period between the falling edge of the driving signal 312 and the time when the $V_{DS}$ exceeds zero at 318 and is denoted by 303B in FIG. 3.

The selection of the reference voltage threshold value used for comparison with the drain-to-source voltage of the field effect transistor impacts the timing of a synchronous rectification circuit. In various embodiments, it may be desirable to vary the value of the reference voltage threshold during operation of a synchronous rectification circuit. This may improve the power-consumption efficiency of rectification or the performance of a design where it may be preferable to coordinate operation of the field effect transistors of a rectification circuit with other parts of a design.

In various embodiments, this may be desirable where an embodiment of a full-bridge synchronous rectification circuit 200 is incorporated into a resonant converter with LCC topology. An LCC topology may be preferable in some situations where the load is subject to change such as LED lighting. In some cases load changes may occur dynamically, for example dimming lights. The LCC topology synchronous rectification conduction may be dependent on the output load and the operating frequency of the DC-DC stage. Varying the output load, the operating frequency of a DC-DC stage of a resonant converter, or both may also vary the slope of the change in the drain-to-source voltage of a field effect transistor. This may also impact the timing of the synchronous rectification. And, in various embodiments, it may adversely impact coordination between the DC-DC stage of a resonant converter and a synchronous rectification circuit.

Figure 4:
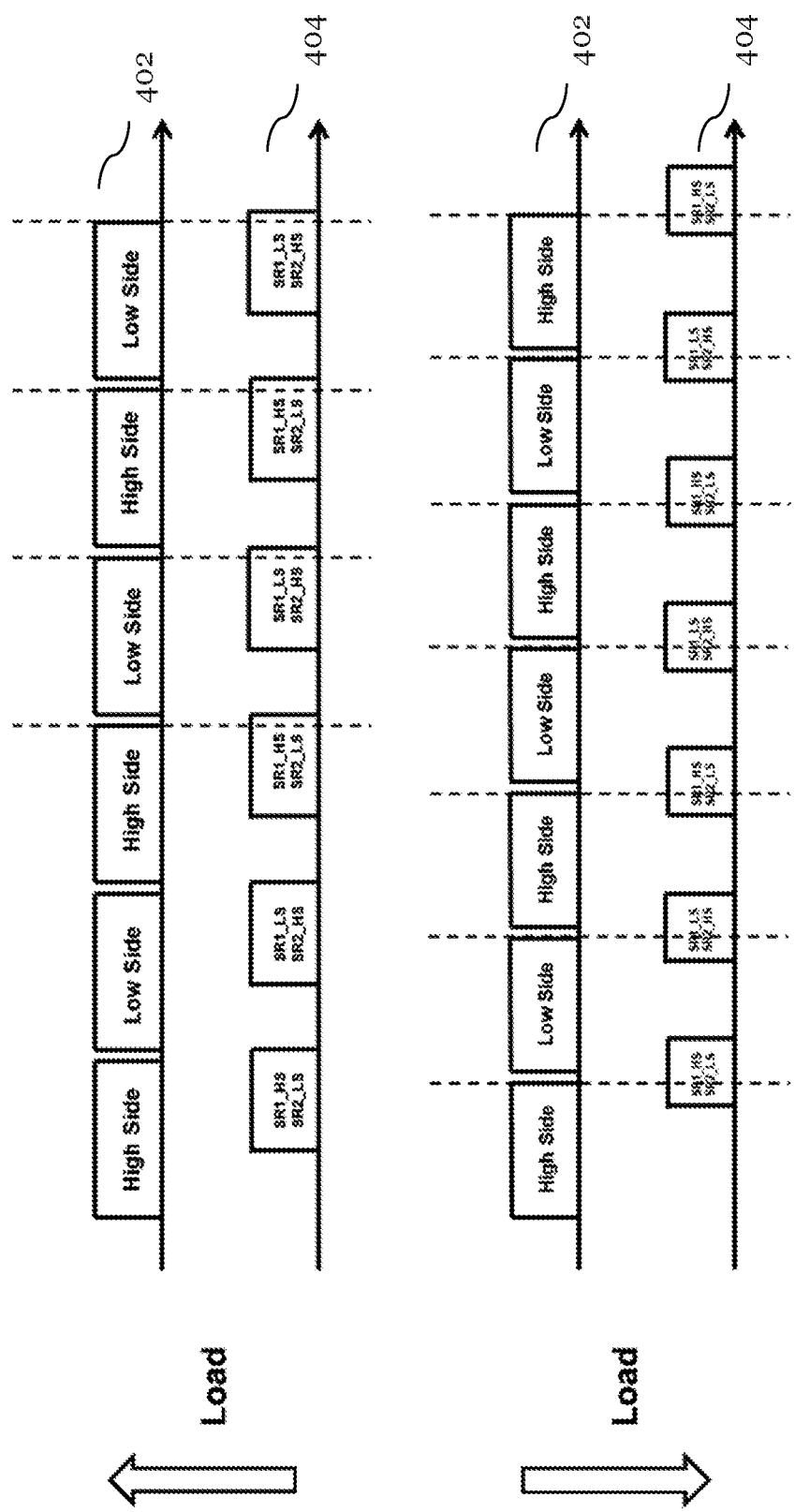
FIG. 4 illustrates misalignment caused by load variations of at the output of the synchronous rectification circuit.

FIG. 4 illustrates misalignment that may be caused by load variations at the output of the full-bridge synchronous rectification circuit 200. A DC-DC stage driving signal 402 may comprise a pulse for high side and low side switching. As mentioned elsewhere, the DC-DC stage may comprise a Half Bridge LCC.

A driving scheme 404 for a synchronous rectification circuit may comprise a first synchronous rectification signal SR1 and a second synchronous rectification signal SR2. For rectification in various embodiments, the first synchronous rectification signal SR1 may be high during the high side pulse for the DC-DC stage and low during the low side pulse for the DC-DC stage. Similarly, the second synchronous rectification signal SR2 may be high during the low side pulse for the DC-DC stage and high during the low side pulse for the DC-DC stage. The first signal, SR1, may be delivered to a high side field effect transistor SR1-HS and a low side field effect transistor SR2_LS. The second signal, SR2, may be delivered to a high side field effect transistor SR2-HS and a low side field effect transistor SR1_LS. In FIG. 4, SR1 is denoted by pulses labeled SR1_HS and SR2_LS while SR2 is denoted by pulses labeled SR1_LS and SR2_HS.

The coordination of the aforementioned signals may be disrupted by variations in operating frequency of the DC-DC stage or output load. As mentioned elsewhere, the rate of change of the drain-to-source voltage of a field effect transistor may change when the output load or operating frequency of the DC-DC stage changes. This may cause the field effect transistors of a synchronous rectification circuit 200 to be wrongly driven. This misalignment is illustrated by the migration of the pulses of the driving scheme for the synchronous rectification circuit shown in FIG. 4.

Figure 5:
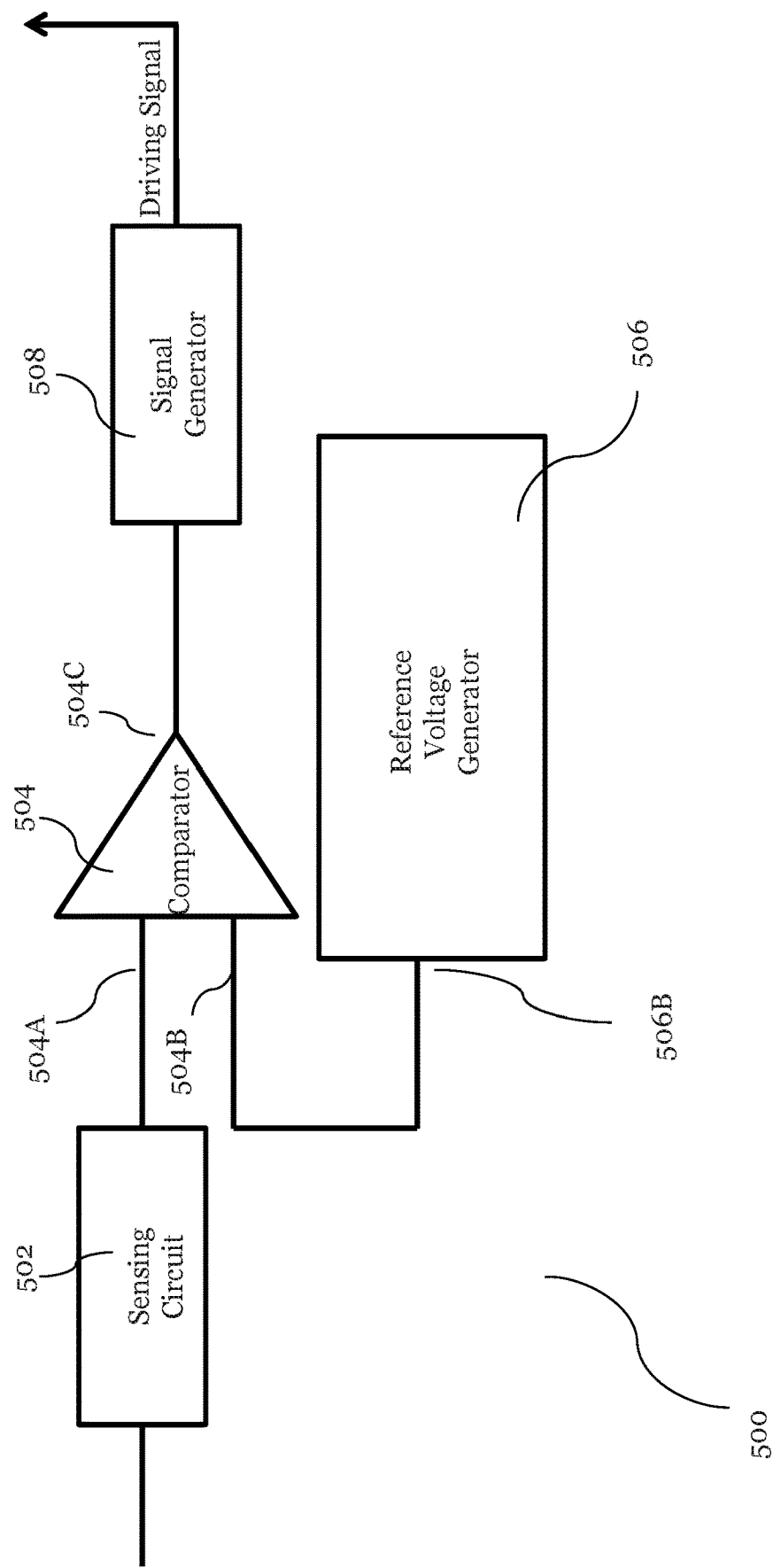
FIG. 5 illustrates a driving circuit for a field effect transistor.

FIG. 5 illustrates an embodiment of a driving circuit for a field effect transistor. The driving circuit 500 may adapt a reference voltage threshold according to the operating frequency of a complementary circuit, an output load, or both.

In various embodiments, a driving circuit 500 may be used in conjunction with the full-bridge synchronous rectification circuit 200. The driving circuit 500 may also be used in conjunction with other systems.

The driving circuit 500 may comprise a sensing circuit 502 configured to sense the drain-to-source voltage of a field effect transistor and provide the drain-to-source voltage of the field effect transistor to a first input 504A of a comparator 504. In some embodiments, the sensing circuit 502 may be separated from the driving circuit 500. For example, in various embodiments wherein the driving circuit 500 is disposed on a microcontroller, the sensing circuit 502 may not also be disposed on the microcontroller. In some embodiments, the sensing circuit 502 may be part of the microcontroller. In various embodiments, the sensing circuit 502 may serve a dual function to protect a microcontroller from a potentially large $V_{DS}$ voltage and to sense $V_{DS}$.

In some embodiments, the driving circuit 500 may be coupled with a synchronous rectification circuit to drive a field effect transistor of a synchronous rectification circuit. In various embodiments, a driving circuit 500 may sense the drain-to-source voltage of the second field effect transistor 204 of FIG. 2. The location of the node where the drain-to-source voltage of the second field effect transistor 204 may be sensed in various embodiments is denoted by $V_{DS}$, in FIG. 2.

In various embodiments, a driving circuit 500 may be sense the drain-to-source voltage of the fourth field effect transistor 208 of FIG. 2. The location of the node where the drain-to-source voltage of the fourth field effect transistor 206 may be sensed in some embodiments is denoted by $V_{DS2}$ in FIG. 2. It may be advantageous to sense a drain to source voltage at a low-side transistor coupled to a ground of a microcontroller.

The driving circuit 500 may also comprise a reference voltage generator 506 to generate a reference voltage threshold wherein the reference voltage threshold is determined by an operating frequency of a complementary circuit, the output load, or both. For example, in various embodiments, a complementary circuit may comprise a DC-DC stage, which in conjunction a full-bridge synchronous rectification circuit 200 driven by the driving circuit 500 and other components may comprise a power converter. In various embodiments, the DC-DC stage may comprise a Half Bridge LCC of the LCC resonant converter with synchronous rectification 201. In various embodiments, the complementary circuit may comprise a Half Bridge LCC 203.

In various embodiments, the first input 504A of the comparator 504 is configured to receive a drain-to-source voltage of a field effect transistor as mentioned elsewhere in this disclosure. A second input 504B of the comparator may be coupled to an output of the reference voltage generator 506B to receive the reference voltage.

The driving circuit 500 may also comprise a signal generator 508 coupled to an output of the comparator 504C that is configured to deliver a driving signal to a gate terminal of a field effect transistor to drive the field effect transistor on after the drain-to-source voltage of the field effect transistor becomes less than the reference voltage and to drive the field effect transistor off after the drain-to-source voltage of the field effect transistor becomes greater than the reference voltage. The signal generator 508 may comprise a timer that is triggered at the falling edge of the output of the comparator 504, which may turn on a driving signal after a turn-on delay and gate-driver delay.

In various embodiments, the driving signal may be delivered to a gate of the first field effect transistor 202C or a gate of the third field effect transistor 206C. In various embodiments, the same driving signal may be delivered to the gate of more than one field effect transistor.

For example, a driving circuit 500 may deliver the same driving signal to the gate of the first field effect transistor 202C and the gate of the second field effect transistor 204C. The driving signal may drive the first field effect transistor 202 and the second field effect transistor 204 on after the drain-to-source voltage of the second field effect transistor 204 becomes less than the reference voltage threshold and drive the first field effect transistor 202 and the second field effect transistor 204 off after the drain-to-source voltage of the second field effect transistor 204 becomes greater than the reference voltage threshold.

Another driving circuit 500 may deliver another driving signal to the gate of the third field effect transistor 206C and the gate of the fourth field effect transistor 208C. This driving signal may drive the third field effect transistor 206 and the fourth field effect transistor 208 on after the drain-to-source voltage of the fourth field effect transistor 208 becomes less than the reference voltage threshold and drive the third field effect transistor 206 and the fourth field effect transistor 208 off after the drain-to-source voltage of the fourth field effect transistor 208 becomes greater than the reference voltage threshold. The driving circuit 500 may also be utilized to drive field effect transistors in other types of circuits.

Figure 6:
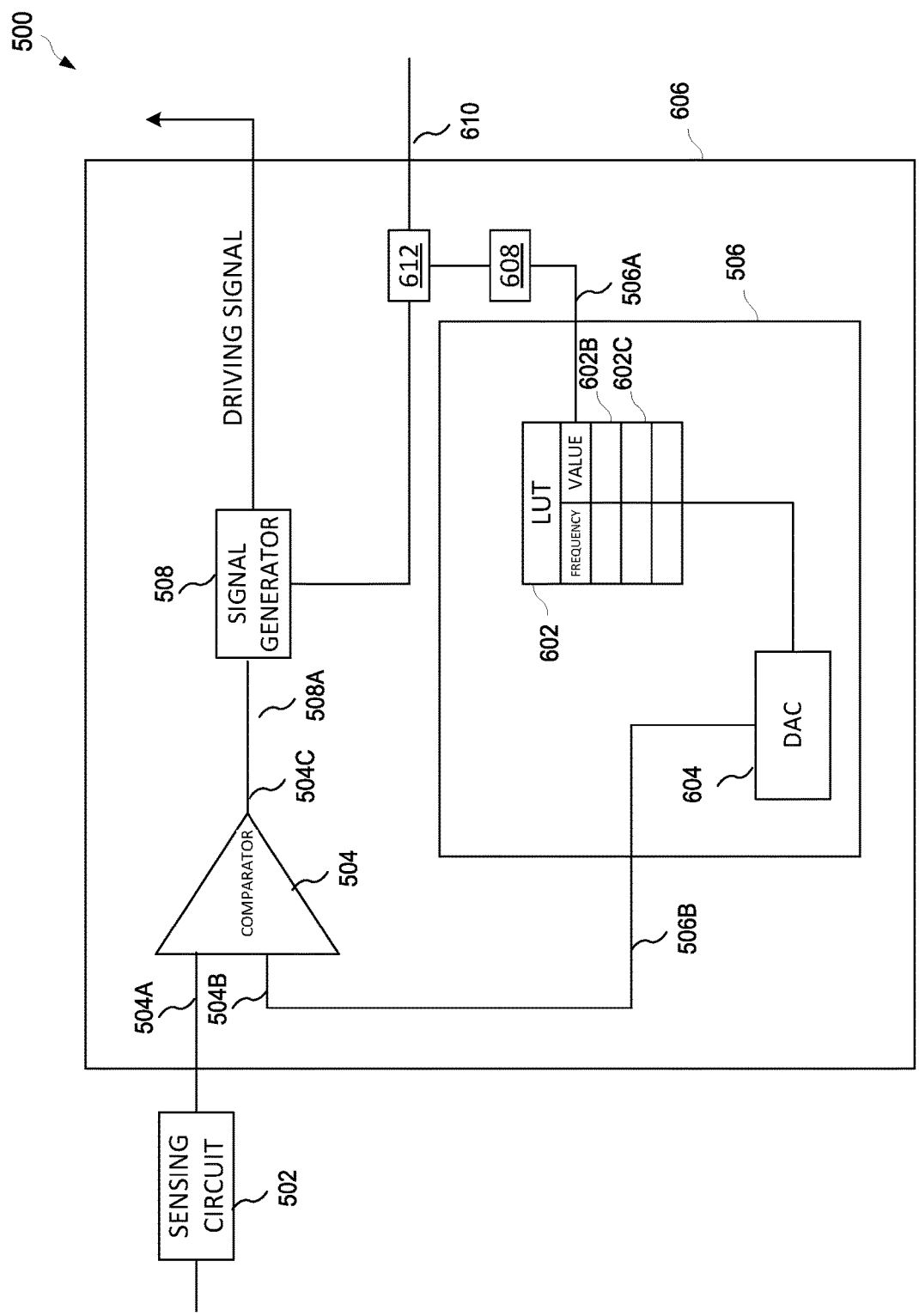
FIG. 6 illustrates a driving circuit for a field effect transistor.

A lookup table may be utilized when adjusting the reference voltage threshold according to the frequency of a complementary circuit, an output load, or both. FIG. 6 illustrates an embodiment of the driving circuit 500. In various embodiments, the reference voltage generator 506 of a driving circuit 500 may comprise a lookup table 602. The lookup table 602 may comprise a first field 602A to store a first value. In various embodiments, the reference voltage generator 506 sets the reference voltage threshold to the first value when the operating frequency of the complementary circuit is at a first corresponding frequency. The first frequency may also be stored in a corresponding field of the lookup table 602. It should be appreciated that the first frequency may comprise a range of frequencies or threshold frequency.

In some embodiments, the lookup table 602 may comprise a second field 602B to store a second value. In some embodiment, the reference voltage generator 506 sets the reference voltage threshold to the second value when the operating frequency of the complementary circuit is at a second frequency. In various embodiments, the lookup table 602 may comprise additional fields, like for example a third field 602C, storing additional possible values of the reference voltage threshold. Each additional possible reference voltage threshold may correspond to a different operating frequency for the complementary circuit. As will be appreciated, each additional possible reference voltage may be corresponded to a range of frequencies or threshold frequency. There additional possible operating frequencies may vary by a consistent amount. For example, for each 1 KHz change in operating frequency there may be a corresponding reference voltage.

By adapting the reference voltage threshold according to changes in operating frequency, the driving circuit 500 may drive a field effect transistor to provide preferable timing despite changes in operating frequency of a complementary circuit. For example, in various embodiments, the first field effect transistor 202, the second field effect transistor 204, the third field effect transistor 206, and the fourth field effect transistor 208 of the full-bridge rectifier circuit may be driven in line with a DC-DC stage—which may comprise a Half Bridge LCC 203, of an LCC resonant converter with synchronous rectification 201—while the slope of the change of the drain to source voltage of the field effect transistors may vary because operating frequency of the DC-DC stage is changing. When the operating frequency of the DC-DC stage is at the first frequency the reference voltage threshold may be set to the first value. When the operating frequency of the DC-DC stage is at the second frequency, the reference voltage threshold may be set to the second value.

In various embodiments, the lookup table 602 may be preprogrammed for a known topology of the complementary circuit. In various embodiments, this may allow the driving circuit 500 to quickly adapt to changes in the operating frequency of a complementary circuit.

In various embodiments, the reference voltage threshold may be determined by another characteristic of a complementary circuit such as the output current of a synchronous rectification circuit, or the output voltage of a synchronous rectification circuit. In various embodiments, ranges of output currents may be corresponded to values of the reference voltage threshold.

In various embodiments of the driving circuit 500, the comparator 504, the signal generator 508, and reference voltage generator 506 may be disposed on a microcontroller 606. The microcontroller 606 may manage the operating frequency of the DC-DC stage of the LCC resonant converter with synchronous rectification 201 or other power converter. The microcontroller 606 may also monitor the output voltage and current of the synchronous rectification circuit, for example at the output port 210. The microcontroller 606 may receive the output voltage, current or both at an input 610. Input 610 may comprise a plurality of ports. For example, it may comprise one port to receive output voltage and one port to receive output current. In various embodiments, the microcontroller 606 may comprise an analog to digital converter 612 that converts the output voltage, current or both into a digital form. The microcontroller 606 may comprise control logic 608 to set the operating frequency of the DC-DC stage of the LCC resonant converter with synchronous rectification 201 based on the output voltage, output current or both. The operating frequency of the DC-DC may be dependent on voltage in one mode of operation and output current in another mode of operation. The microcontroller 606 may internally communicate the value of the operating frequency the lookup table 602. The lookup table 602 may receive the value of the operating frequency at an input 506A. The operating frequency may be communicated to the reference voltage generator 506 an input 506A. The operating frequency may be communicated to the lookup table 602 periodically. This may occur at preset intervals or vary dynamically during operation.

In various embodiments, the reference voltage generator 506 may comprise a digital to analog converter 604 to convert a digital output signal from the lookup table 602 into the reference voltage threshold to be output to the second input 504B of the comparator 504.

A synchronous rectification circuit, including, but not limited to, the full-bridge synchronous rectification circuit 200, may provide rectification even when the field effect transistors are not being driven. This may occur due to conduction by the internal body diode of the field effect transistors represented as 202D, 204D, 206D, and 208D in FIG. 2.

In some circumstances, it may be desirable to disable the driving circuit 500 to allow the rectification by body-diode conduction. This may be preferable when the output current of the synchronous rectification circuit low. In various embodiments, the output current may be measured at the output port 210.

Returning to FIG. 6, in various embodiments, the driving circuit 500 may be enabled when an output current, which may be measured at the output 210 or the full-bridge synchronous rectification circuit in some embodiments, is greater than a current threshold value and disabled when the output current of the synchronous rectification circuit is less than the current threshold. The output current may be received at input 610 and converted into a digital form by an analog to digital converter 612. An output of the analog to digital converter 612 may be received by the signal generator 508 and compared with a reference current threshold. The output of the analog to digital converter 612 may communicate the output current. The signal generator 508 may be disabled when the output current is less than the current threshold. In various embodiments, the signal generator 508 may comprise a timer that initiates the driving signal. The timer may be disabled when the output current is less than the threshold current.

In various embodiments, the microcontroller 606 may comprise circuitry to convert a signal communicating the current of the output of the rectification circuit, for example, the full-bridge synchronous rectification circuit 200, into a digital form to disable the signal generator 508. This circuitry may comprise an analog to digital converter 612. In some embodiments, the signal generator 508 comprises a PWM signal generator.

Figure 7:
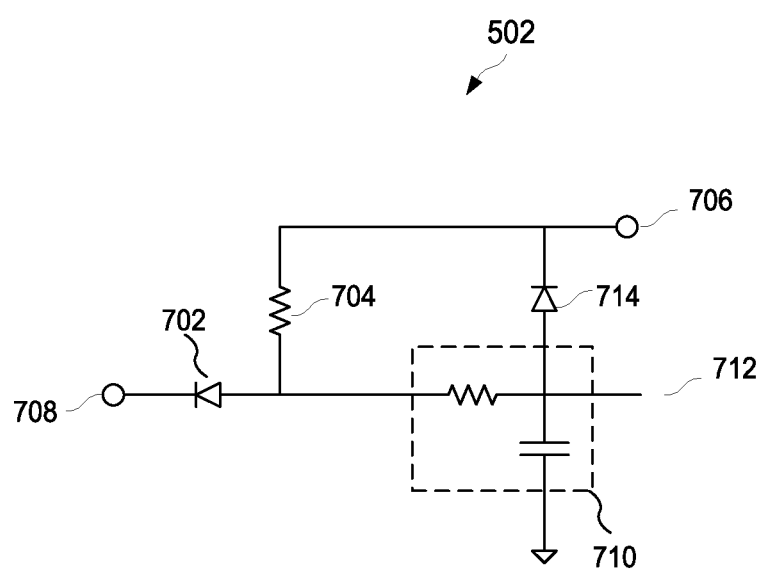
FIG. 7 illustrates an embodiment of a sensing circuit.

FIG. 7 illustrates an embodiment of a sensing circuit 502. In various embodiments, the sensing network is composed of a fast diode 702 and a pull-up resistor 704 connected to the microcontroller supply voltage 706. In some embodiments, the microcontroller supply voltage 706 may provide 3.3V. The sensing circuit 502 may receive the drain-to-source voltage of a field effect transistor at an input 708. For example, the sensing circuit 502 may receive $V_{DS1}$, as shown in FIG. 2, of the second field effect transistor 204. In various embodiments, the sensing circuit 502 may receive $V_{DS2}$, as shown in FIG. 2, of the fourth effect transistor 208.

In some embodiments, when the drain-to-source voltage of the field effect transistor received at the input 708 is above the microcontroller supply voltage, the fast diode 702 is reverse biased and the sensed voltage is pulled up to the microcontroller supply voltage 706. When the drain-to-source voltage of the field effect transistor received at the input 708 is below the microcontroller supply voltage 706, the fast diode 702 is forward biased and the sensed voltage is equal to this voltage plus the voltage drop of the diode that gives a positive shift.

The sensed voltage may then be provided via an output of the sensing circuit 502 to the first input 504A of the comparator 504. The current during positive biasing is limited by the pull-up resistor 704. The sensing circuit 502, in various embodiments, may comprise an RC filter 710. The sensing circuit 502 may also comprise a clamping diode 714.

Figure 8:
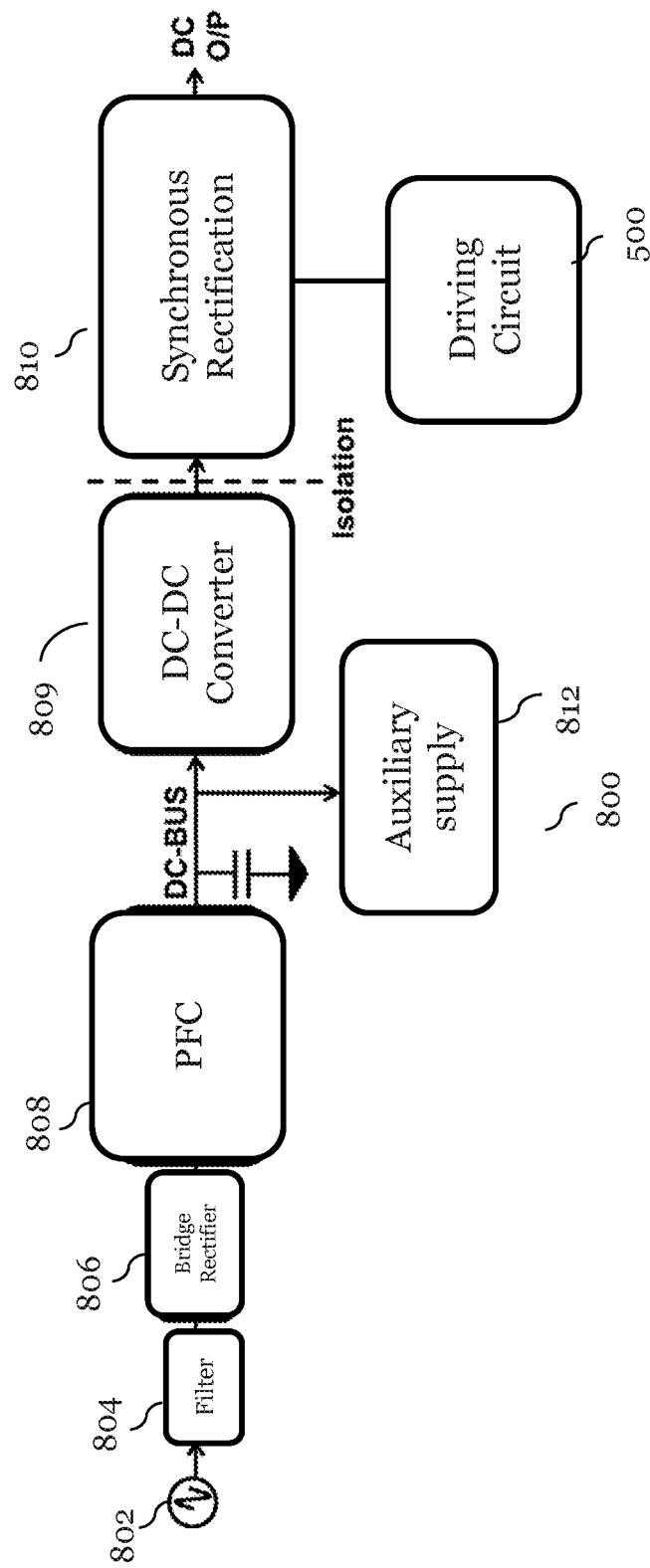
FIG. 8 illustrates a block diagram of a power converter with a synchronous rectification circuit and driving circuit.

FIG. 8 illustrates a block diagram of a power converter with a synchronous rectification circuit and driving circuit. The power converter 800 may comprise an input 802 to receive an input signal. The power converter 800 may further comprise a filter 804 and a bridge rectifier 806. In various embodiments, the power converter 800 may comprise a power factor correction circuit 808.

The power converter 800 may also comprise a DC-DC converter 809, which may comprise a Half Bridge LCC 203 in various embodiments. The power converter 800 may further comprise a synchronous rectification circuit 810. The synchronous rectification circuit 810 may comprise various forms such as the embodiments of synchronous rectification circuit described herein including, but not limited to, the full-bridge synchronous rectification circuit 200. The synchronous rectification circuit 810 may be driven by one driving circuit 500. The power converter 800 may further comprise an auxiliary power supply 812.

Figure 9:
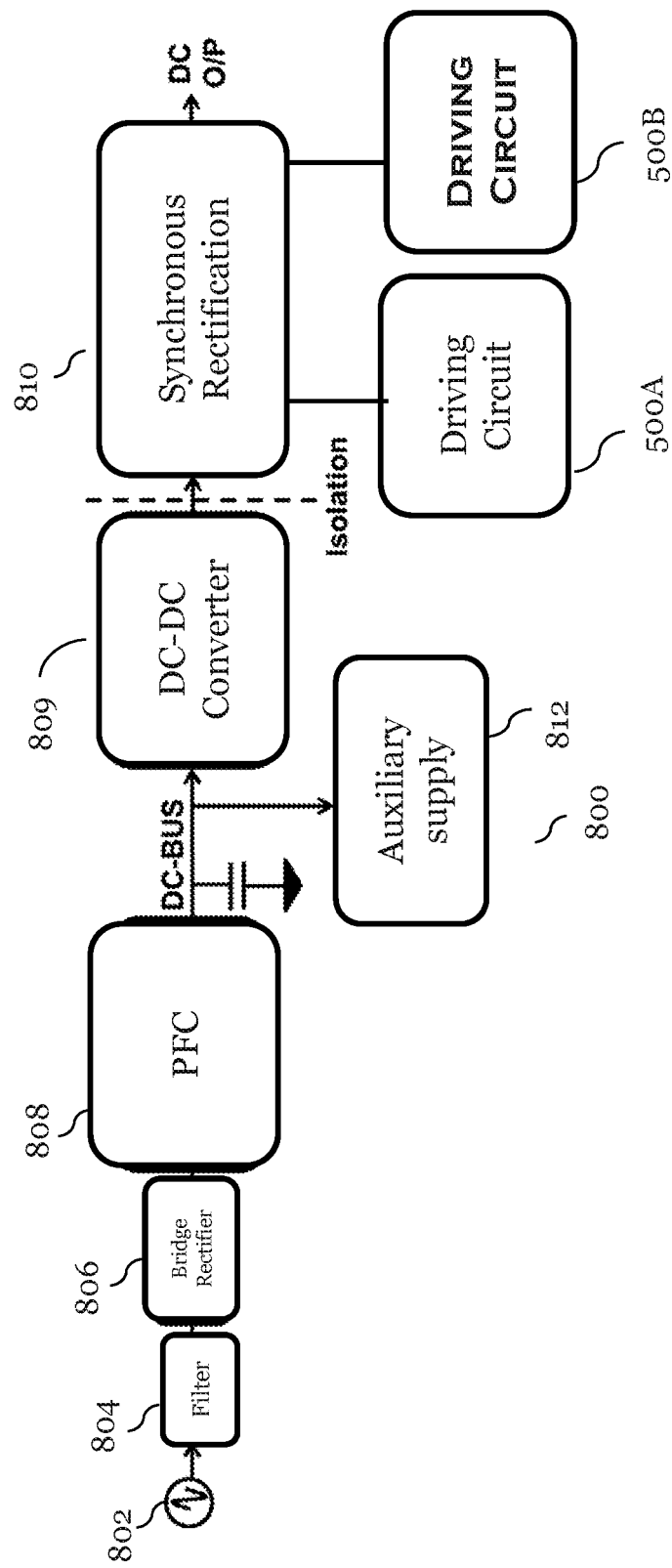
FIG. 9 illustrates a block diagram of a power converter with a synchronous rectification circuit and two driving circuits.

FIG. 9 illustrates a block diagram of a power converter with a synchronous rectification circuit and two driving circuits. In various embodiments of the power converter 800, the synchronous rectification circuit 810 may be driven by a first driving circuit 500A and a second driving circuit 500B. The first driving circuit 500A may comprise any embodiment of the driving circuit 500. The second driving circuit 500B may comprise any embodiment of the driving circuit 500.

Figure 10:
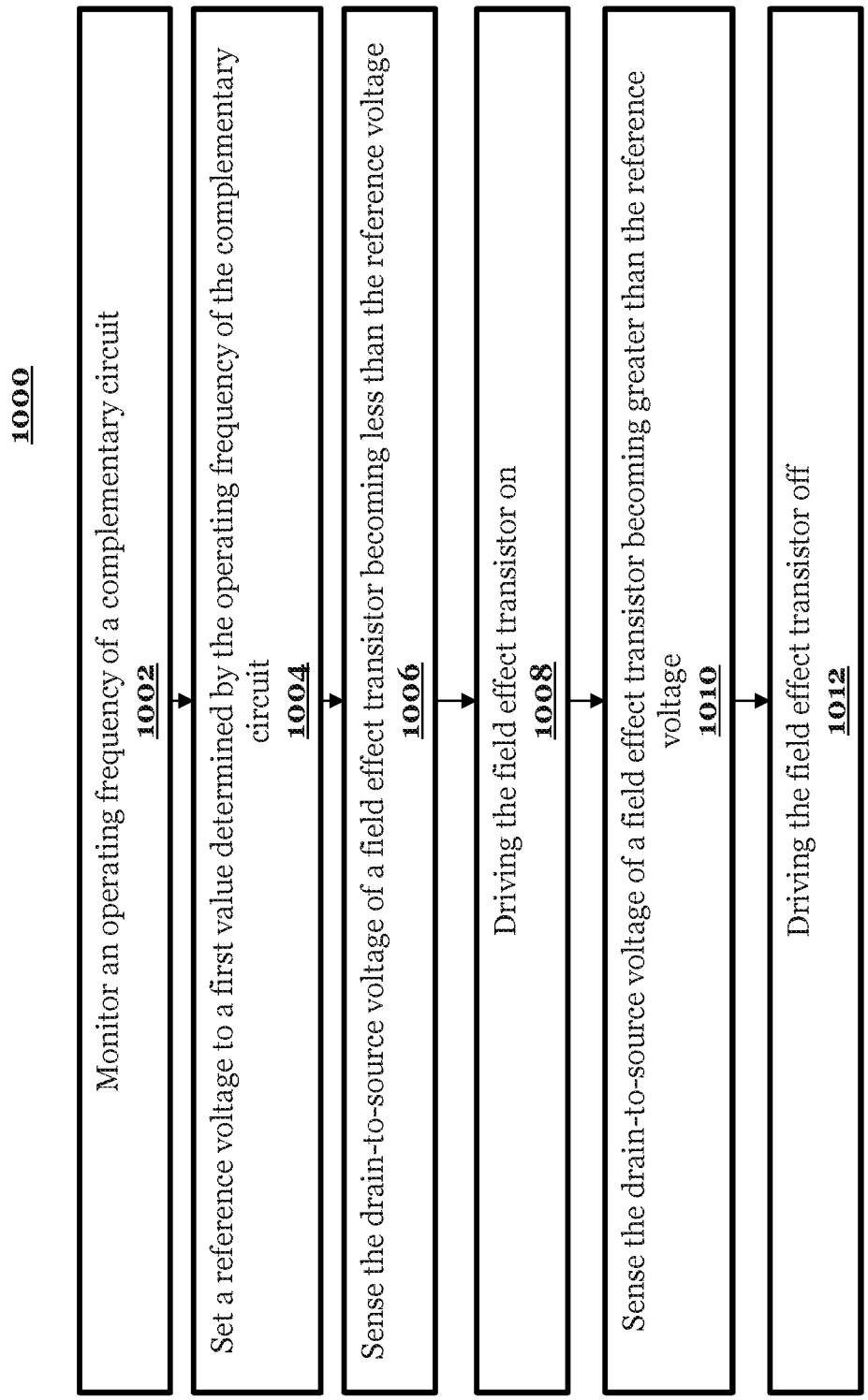
FIG. 10 illustrates a method for driving a field effect transistor.

FIG. 10 illustrates a method for driving a field effect transistor 1000 that may comprise at a step 1002 monitoring an operating frequency of a complementary circuit. The method for driving a field effect transistor 1000 may further comprise: at a step 1004, setting a reference voltage to a first value determined by the operating frequency of the complementary circuit; at a step 1006, sensing a drain-to-source voltage of the field effect transistor becoming less than a reference voltage; at a step 1008, driving the field effect transistor on; at a step 1010 sensing a drain-to-source voltage of the field effect transistor becoming greater than the reference voltage; and at a step 1012, driving the field effect transistor off.

In various embodiments, the method for driving a field effect transistor 1000 may further comprise observing a new operating frequency of the complementary circuit and setting the reference voltage to a second value determined by the new operating frequency of the complementary circuit.

In various embodiments, the method for driving a field effect transistor 1000 may further comprise driving a second field effect transistor on and off with the field effect transistor.

The method for driving a field effect transistor 1000 may further comprise driving a second field effect transistor on after the drain-to-source voltage becomes less than the reference voltage and driving the second field effect transistor off after the drain-to-source voltage becomes greater than the reference voltage.

In various embodiments, the method for driving a field effect transistor 1000 may further comprise: having a reference voltage generator to generate the reference voltage; having a comparator comprising: a first input configured to receive the drain-to-source voltage of the field effect transistor; and a second input coupled to an output of the reference voltage generator to receive the reference voltage. The method for driving a field effect transistor 1000 may further comprise having a signal generator coupled to an output of the comparator, the signal generator being configured to deliver a driving signal to a gate terminal of the field effect transistor.

The method for driving a field effect transistor 1000 may further comprise wherein the reference voltage generator comprises a lookup table comprising a first field to store a first value and wherein the reference voltage generator sets the reference voltage to the first value when the operating frequency of the complementary circuit is at a first frequency.

In various embodiments, the method for driving a field effect transistor 1000 may further comprise wherein the lookup table comprises a second field to store a second value and wherein the reference voltage generator sets the reference voltage to the second value when the operating frequency of the complementary circuit is at a second frequency.

In various embodiments, the method for driving a field effect transistor 1000 may further comprises wherein the reference voltage generator comprises a lookup table comprising a plurality of fields storing a plurality of values that are corresponded to a plurality of potential operating frequencies, the first value being corresponded to a first potential operating frequency.

The method for driving a field effect transistor 1000 may further comprise, wherein the reference voltage generator comprises a digital to analog converter to convert an output signal from the lookup table into the reference voltage.

Example 1. A driving circuit including a reference voltage generator to generate a reference voltage wherein the reference voltage is based on an operating frequency of a complementary circuit; a comparator including: a first input configured to receive a drain-to-source voltage of a first low side field effect transistor; and a second input coupled to an output of the reference voltage generator to receive the reference voltage. The driving circuit further including a signal generator coupled to an output of the comparator, the signal generator being configured to deliver a driving signal to a gate terminal of the first low side field effect transistor to drive the first low side field effect transistor to an ON state after the drain-to-source voltage of the first low side field effect transistor becomes less than the reference voltage and to drive the first low side field effect transistor to an OFF state after the drain-to-source voltage of the first low side field effect transistor becomes greater than the reference voltage.

Example 2. The driving circuit of example 1, wherein the reference voltage generator includes a lookup table including a first field to store a first value and wherein the reference voltage generator sets the reference voltage to the first value when the operating frequency of the complementary circuit is at a first frequency.

Example 3. The driving circuit of example 1 or example 2, wherein the lookup table includes a second field to store a second value and wherein the reference voltage generator sets the reference voltage to the second value when the operating frequency of the complementary circuit is at a second frequency.

Example 4. The driving circuit of examples 1 to 3, wherein the lookup table includes a plurality of additional fields to store a plurality of additional values and wherein the reference voltage generator sets the reference voltage to a selected value of the plurality of additional values when the operating frequency of the complementary circuit is at a corresponding frequency to the selected value of the plurality of additional values.

Example 5. The driving circuit of examples 1 to 4, wherein the reference voltage generator includes a digital to analog converter to convert an output signal from the lookup table into the reference voltage.

Example 6. The driving circuit of examples 1 to 5, wherein the reference voltage generator includes an input to receive a signal communicating the operating frequency of the complementary circuit.

Example 7. The driving circuit of examples 1 to 6, wherein the driving signal is delivered to a gate terminal of a first high side field effect transistor to drive the first high side field effect transistor on after the drain-to-source voltage of the first low side field effect transistor becomes less than the reference voltage and to drive the first high side field effect transistor off after the drain-to-source voltage of the first low side field effect transistor becomes greater than the reference voltage.

Example 8. The driving circuit of examples 1 to 7, wherein the complementary circuit includes a half bridge LCC of an LCC resonant converter with synchronous rectification 201.

Example 9. The driving circuit of examples 1 to 8, wherein the signal generator is enabled by an input signal communicating a current of an output of a rectification circuit when the current of the output of the rectification circuit is above a current threshold and disabled when the current of the output of the rectification circuit is below the current threshold.

Example 10. The driving circuit of examples 1 to 9, further including a voltage-sensing circuit configured to sense the drain-to-source voltage of the first low side field effect transistor and provide the drain-to-source voltage of the first low side field effect transistor to the first input of the comparator.

Example 11. The driving circuit of examples 1 to 10, wherein the signal generator includes a PWM signal generator.

Example 12. The driving circuit of examples 1 to 11, wherein the driving signal is further determined by a current of an output of a rectification circuit.

Example 13. A rectification circuit including: a first field effect transistor; a second field effect transistor; a third field effect transistor; and a fourth field effect transistor. The rectification circuit further including a first driving circuit wherein the first driving circuit is configured to drive the first field effect transistor and the second field effect transistor to an ON state after a drain-to-source voltage of the second field effect transistor becomes less than a first reference voltage and to drive the first field effect transistor and the second field effect transistor to an OFF state after the drain-to-source voltage of the second field effect transistor becomes greater than the first reference voltage; and a second driving circuit wherein the second driving circuit is configured to drive the third field effect transistor and the fourth field effect transistor to an ON state after a drain-to-source voltage of the fourth field effect transistor becomes less than a second reference voltage and to drive the third field effect transistor and the fourth field effect transistor to an OFF state after the drain-to-source voltage of the fourth field effect transistor becomes greater than the second reference voltage. The rectification circuit further including an output port configured to be coupled to a load; and wherein the first reference voltage is determined by an operating frequency of a complementary circuit and the second reference voltage is determined by the operating frequency of the complementary circuit and the first field effect transistor, the second field effect transistor, the third field effect transistor, and the fourth field effect transistor are configured to cooperate to provide a rectified current to the output port.

Example 14. The rectification circuit of example 13, wherein a source of the first field effect transistor is coupled to a first input terminal, a drain of the first field effect transistor is coupled to a first output terminal of the output port, a source of the second field effect transistor is coupled to a second output terminal of the output port, and a drain of the second field effect transistor is coupled to a second input terminal.

Example 15. The rectification circuit of example 13 or example 14, wherein a source of the third field effect transistor is coupled to the second input terminal, a drain of the third field effect transistor is coupled to the first output terminal of the output port, a source of the fourth field effect transistor is coupled to the second output terminal of the output port, and a drain of the fourth field effect transistor is coupled to the first input terminal.

Example 16. The rectification circuit of examples 13 to 15, wherein the first driving circuit includes: a reference voltage generator to generate the first reference voltage; a comparator including: a first comparator input configured to receive the drain-to-source voltage of the second field effect transistor; and a second comparator input coupled to an output of the reference voltage generator to receive the first reference voltage; and a signal generator coupled to an output of the comparator wherein the signal generator is configured to deliver a first driving signal to a gate terminal of the first field effect transistor and deliver the first driving signal to a gate terminal of the second field effect transistor.

Example 17. The rectification circuit of examples 13 to 16, wherein the reference voltage generator includes a lookup table including a first field to store a first value and wherein the reference voltage generator sets the first reference voltage to the first value when the operating frequency of the complementary circuit is at a first frequency.

Example 18. The rectification circuit of examples 13 to 17, wherein the lookup table includes a second field to store a second value and wherein the reference voltage generator sets the first reference voltage to the second value when the operating frequency of the complementary circuit is at a second frequency.

Example 19. The rectification circuit of examples 13 to 18, wherein the reference voltage generator includes a digital to analog converter to convert an output signal from the lookup table into the first reference voltage.

Example 20. The rectification circuit of examples 13 to 19 wherein the reference voltage generator includes an input to receive a signal communicating the operating frequency of the complementary circuit.

Example 21. The rectification circuit of examples 13 to 20, wherein the signal generator is enabled by an input signal communicating an output current of the rectification circuit when the output current of the rectification circuit is above a current threshold and disabled when the output current of the rectification circuit is below the current threshold Example 22. The rectification circuit of examples 13 to 21, the first reference voltage is determined by an output current of the rectification circuit and the second reference voltage is determined by the output current of the rectification circuit.

Example 23. A method to drive a field effect transistor including: monitoring an operating frequency of a complementary circuit; setting a reference voltage to a first value determined by the operating frequency of the complementary circuit; sensing a drain-to-source voltage of the field effect transistor becoming less than a reference voltage; driving the field effect transistor on; sensing a drain-to-source voltage of the field effect transistor becoming greater than the reference voltage; and driving the field effect transistor off.

Example 24. The method of example 23, further including observing a new operating frequency of the complementary circuit and setting the reference voltage to a second value determined by the new operating frequency of the complementary circuit.

Example 25. The method of example 23 or example 24, further including driving a second field effect transistor on and off with the field effect transistor.

Example 26. The method of examples 23 to 25, further including: having a reference voltage generator to generate the reference voltage; having a comparator including: a first input configured to receive the drain-to-source voltage of the field effect transistor; and a second input coupled to an output of the reference voltage generator to receive the reference voltage; and having a signal generator coupled to an output of the comparator, the signal generator being configured to deliver a driving signal to a gate terminal of the field effect transistor.

Example 27. The method of examples 23 to 26, wherein the reference voltage generator includes a lookup table including a plurality of fields storing a plurality of values that are corresponded to a plurality of potential operating frequencies, the first value being corresponded to a first potential operating frequency.

Example 28. The method of examples 23 to 27, wherein the reference voltage generator includes a digital to analog converter to convert an output signal from the lookup table into the reference voltage.

Example 29. The method of examples 23 to 28, further including setting the operating frequency of the complementary circuit based on an output current of a synchronous rectification circuit including the field effect transistor.

References to illustrative embodiments in this description are not intended to be construed in a limiting sense. Various modifications and combinations of the illustrative embodiments, as well as other embodiments will be apparent to persons skilled in the art upon reference to the description. It is therefore intended that the appended claims encompass any such modifications or embodiments.

What is claimed is:

1. A driving circuit comprising:
   a reference voltage generator to generate a reference voltage, wherein the reference voltage is adjusted depending on changes in an operating frequency of a complementary circuit;
   a comparator comprising:
     a first input configured to receive a drain-to-source voltage of a first low side field effect transistor; and
     a second input coupled to an output of the reference voltage generator to receive the reference voltage; and
   a signal generator coupled to an output of the comparator, the signal generator being configured to deliver a driving signal to a gate terminal of the first low side field effect transistor to drive the first low side field effect transistor to an ON state after the drain-to-source voltage of the first low side field effect transistor becomes less than the reference voltage and to drive the first low side field effect transistor to an OFF state after the drain-to-source voltage of the first low side field effect transistor becomes greater than the reference voltage, wherein the reference voltage generator comprises a lookup table comprising a first field and a second field, the first field used to store a first value and an associated first frequency range comprising a first range of frequencies, the second field used to store a second value and an associated second frequency range comprising a second range of frequencies, wherein the reference voltage generator adjusts the reference voltage to the first value or the second value in response to the operating frequency of the complementary circuit being, respectively, within the first frequency range or the second frequency range, and wherein the reference voltage generator comprises a digital to analog converter to convert an output signal from the lookup table into the reference voltage.

2. The driving circuit of claim 1, wherein a frequency width of the first frequency range is 1 KHz.

3. The driving circuit of claim 2, wherein the lookup table comprises a plurality of additional fields to store a plurality of additional values and wherein the reference voltage generator adjusts the reference voltage to a selected value of the plurality of additional values when the operating frequency of the complementary circuit is at a corresponding frequency range to the selected value of the plurality of additional values.

4. The driving circuit of claim 1, wherein the reference voltage generator comprises an input to receive a signal communicating the operating frequency of the complementary circuit.

5. The driving circuit of claim 1, wherein the driving signal is delivered to a gate terminal of a first high side field effect transistor to drive the first high side field effect transistor on after the drain-to-source voltage of the first low side field effect transistor becomes less than the reference voltage and to drive the first high side field effect transistor off after the drain-to-source voltage of the first low side field effect transistor becomes greater than the reference voltage.

6. The driving circuit of claim 1, wherein the complementary circuit comprises a half bridge LCC of an LCC resonant converter with synchronous rectification.

7. The driving circuit of claim 1, wherein the signal generator is enabled by an input signal communicating a current of an output of a rectification circuit when the current of the output of the rectification circuit is above a current threshold and disabled when the current of the output of the rectification circuit is below the current threshold.

8. The driving circuit of claim 1, further comprising a voltage-sensing circuit configured to sense the drain-to-source voltage of the first low side field effect transistor and provide the drain-to-source voltage of the first low side field effect transistor to the first input of the comparator.

9. The driving circuit of claim 1, wherein the signal generator comprises a PWM signal generator.

10. The driving circuit of claim 1, wherein the driving signal is further determined by a current of an output of a rectification circuit.

11. A rectification circuit comprising:
a first field effect transistor;
a second field effect transistor;
a third field effect transistor;
a fourth field effect transistor;
a first driving circuit, wherein the first driving circuit is configured to drive the first field effect transistor and the second field effect transistor to an ON state after a drain-to-source voltage of the second field effect transistor becomes less than a first reference voltage and to drive the first field effect transistor and the second field effect transistor to an OFF state after the drain-to-source voltage of the second field effect transistor becomes greater than the first reference voltage, wherein the first driving circuit comprises
a reference voltage generator to generate the first reference voltage;
a comparator comprising:
a first comparator input configured to receive the drain-to-source voltage of the second field effect transistor; and
a second comparator input coupled to an output of the reference voltage generator to receive the first reference voltage; and
a signal generator coupled to an output of the comparator, wherein the signal generator is configured to deliver a first driving signal to a gate terminal of the first field effect transistor and deliver the first driving signal to a gate terminal of the second field effect transistor;
a second driving circuit, wherein the second driving circuit is configured to drive the third field effect transistor and the fourth field effect transistor to an ON state after a drain-to-source voltage of the fourth field effect transistor becomes less than a second reference voltage and to drive the third field effect transistor and the fourth field effect transistor to an OFF state after the drain-to-source voltage of the fourth field effect transistor becomes greater than the second reference voltage; and an output port configured to be coupled to a load;
wherein the first reference voltage is adjusted depending on an operating frequency of a complementary circuit and the second reference voltage is adjusted depending on the operating frequency of the complementary circuit and the first field effect transistor, the second field effect transistor, the third field effect transistor, and the fourth field effect transistor are configured to cooperate to provide a rectified current to the output port, wherein the reference voltage generator comprises a lookup table comprising a first field to store a first value and an associated first frequency range comprising a first range of frequencies, wherein the reference voltage generator adjusts the first reference voltage to the first value when the operating frequency of the complementary circuit is within the first frequency range, and wherein the reference voltage generator comprises a digital to analog converter to convert an output signal from the lookup table into the first reference voltage.

12. The rectification circuit of claim 11, wherein a source of the first field effect transistor is coupled to a first input terminal, a drain of the first field effect transistor is coupled to a first output terminal of the output port, a source of the second field effect transistor is coupled to a second output terminal of the output port, and a drain of the second field effect transistor is coupled to a second input terminal.

13. The rectification circuit of claim 12, wherein a source of the third field effect transistor is coupled to the second input terminal, a drain of the third field effect transistor is coupled to the first output terminal of the output port, a source of the fourth field effect transistor is coupled to the second output terminal of the output port, and a drain of the fourth field effect transistor is coupled to the first input terminal.

14. The rectification circuit of claim 11, wherein the lookup table comprises a second field to store a second value and wherein the reference voltage generator adjusts the first reference voltage to the second value when the operating frequency of the complementary circuit is at a second frequency range.

15. The rectification circuit of claim 11, wherein the reference voltage generator comprises an input to receive a signal communicating the operating frequency of the complementary circuit.

16. The rectification circuit of claim 11, wherein the signal generator is enabled by an input signal communicating an output current of the rectification circuit when the output current of the rectification circuit is above a current threshold and disabled when the output current of the rectification circuit is below the current threshold.

17. The rectification circuit of claim 11 wherein, the first reference voltage is determined by an output current of the rectification circuit and the second reference voltage is determined by the output current of the rectification circuit.

18. A method to drive a field effect transistor comprising:
monitoring an operating frequency of a complementary circuit;
adjusting a reference voltage depending on changes in the operating frequency of the complementary circuit;
sensing a drain-to-source voltage of the field effect transistor becoming less than a reference voltage;
driving the field effect transistor on;
sensing a drain-to-source voltage of the field effect transistor becoming greater than the reference voltage;
driving the field effect transistor off;
having a reference voltage generator to generate the reference voltage; and
having a comparator comprising
a first input configured to receive the drain-to-source voltage of the field effect transistor,
a second input coupled to an output of the reference voltage generator to receive the reference voltage, and
having a signal generator coupled to an output of the comparator, the signal generator being configured to deliver a driving signal to a gate terminal of the field effect transistor, wherein the reference voltage generator comprises a lookup table comprising a plurality of fields storing a plurality of values that are corresponded to a plurality of potential operating frequency ranges, a first value of the reference voltage being corresponded to a first potential operating frequency range.

19. The method of claim 18, further comprising driving a second field effect transistor on and off at the same times as the field effect transistor.

20. The method of claim 18, wherein the reference voltage generator comprises a digital to analog converter to convert an output signal from the lookup table into the reference voltage.

21. The method of claim 18, further comprising setting the operating frequency of the complementary circuit based on an output current of a synchronous rectification circuit comprising the field effect transistor.

22. The rectification circuit of claim 11, wherein a frequency width of the first frequency range is 1 KHz.

23. The method of claim 18, wherein a frequency width of the first frequency range is 1 KHz.

24. The method of claim 18, wherein the signal generator is enabled by an input signal communicating a current of an output of a rectification circuit in response to the current of the output of the rectification circuit being above a current threshold and disabled in response to the current of the output of the rectification circuit being below the current threshold.

\* \* \* \* \*